US010703397B1

(12) United States Patent
Mendoza

(10) Patent No.: US 10,703,397 B1
(45) Date of Patent: Jul. 7, 2020

(54) HAND TRUCK WITH FOLDING TOE PLATE

(71) Applicant: Harper Trucks, Inc., Wichita, KS (US)

(72) Inventor: José Angel Caceres Mendoza, Wichita, KS (US)

(73) Assignee: Harper Trucks, Inc., Wichita, KS (US)

( * ) Notice: Subject to any disclaimer, the term of this patent is extended or adjusted under 35 U.S.C. 154(b) by 0 days.

(21) Appl. No.: 16/285,932

(22) Filed: Feb. 26, 2019

Related U.S. Application Data

(60) Provisional application No. 62/635,123, filed on Feb. 26, 2018.

(51) Int. Cl.
*B62B 1/12* (2006.01)

(52) U.S. Cl.
CPC ............ *B62B 1/12* (2013.01); *B62B 2205/33* (2013.01)

(58) Field of Classification Search
CPC .............................. B62B 2205/33; B62B 1/12
See application file for complete search history.

(56) References Cited

U.S. PATENT DOCUMENTS 3,104,889 A * 9/1963 Branch, Jr. ............... B62B 1/12 280/30
3,754,771 A * 8/1973 Shagoury ............ B65B 67/1205 280/654
4,448,440 A * 5/1984 Gier .......................... B62B 1/12 280/47.29
6,131,927 A * 10/2000 Krawczyk ................ B62B 1/12 280/47.27
6,158,749 A * 12/2000 Roudebush ............... B62B 1/12 182/16
6,557,869 B2 * 5/2003 Gillette ..................... B62B 1/12 280/47.28
10,118,631 B2 * 11/2018 Gunther .................... B62B 1/12
10,392,041 B1 * 8/2019 Khodor ..................... B62B 1/12
2004/0108667 A1 * 6/2004 Tsai .......................... B62B 1/12 280/40
2004/0201186 A1 * 10/2004 Tornabene ............. B62B 1/002 280/30
2009/0014979 A1 * 1/2009 Snook ....................... B62B 1/14 280/200
2009/0152825 A1 * 6/2009 Adams ...................... B62B 1/14 280/47.31
2012/0049474 A1 * 3/2012 Del Rosario ........... B62B 1/008 280/47.34
2015/0014965 A1 * 1/2015 Gibson ................... B62B 1/002 280/651
2015/0035259 A1 * 2/2015 Umbro ...................... B62B 1/12 280/654
2017/0113826 A1 * 4/2017 Ristoski ............. B65B 67/1205

* cited by examiner

*Primary Examiner* — Erez Gurari
(74) *Attorney, Agent, or Firm* — Robert O. Blinn

(57) ABSTRACT

A hand truck that includes frame assembly, wheels and a toe plate assembly. The frame assembly includes two side members and a base member extending between the lower ends of the side members. The toe plate assembly is rotatably mounted to the frame so that the toe plate is able to rotate between an operating position in which the toe portion extends forward for sliding under and lifting loads and the toe plate rests against the base member of the frame and a storage position in which the toe plate rests upon the wheel axle and an intermediate shipping position such that when the wheels are removed the hand truck may fit into a box having a minimum depth.

4 Claims, 3 Drawing Sheets

HAND TRUCK WITH FOLDING TOE PLATE

RELATED APPLICATIONS

This application claims the benefit of U.S. Provisional Patent Application No. 62/635,123 filed on Feb. 26, 2018, which is incorporated herein by reference in its entirety.

FIELD

This application relates to a hand truck that has a folding toe plate.

BACKGROUND

There is a need for a hand truck having a sturdy, simple arrangement for a folding toe plate that may be positioned in an extended operating position and in a retracted, folded position. It is particularly useful to have a folding toe plate hand truck with easily removable wheels so that the hand truck may be partially disassembled by removing the wheels and shipped in a low profile box at a minimum shipping cost.

SUMMARY

The above noted need is addressed by a hand truck that includes frame assembly, wheels and a toe plate assembly. The frame assembly includes two side members and a base member extending between the lower ends of the side members. The wheels are mounted to a wheel axle that is, in turn, mounted to the two side members by wheel brackets in a manner that is well known in the art. The toe plate assembly includes a toe plate axle and a toe plate. The toe plate axle extends between the side members of the frame and is spaced above the base member. The toe plate axle is rotatably mounted to hand truck frame. The toe plate is formed so that it is generally L shaped so that it presents a brace portion and a toe portion. In this example, the brace portion of the toe plate presents an edge that is suitable for being welded to toe plate axle so that the toe plate and the toe plate axle are able to rotate with respect to the hand truck frame. The toe portion extends away from the brace portion at preferably a right angle. The toe plate assembly is arranged so that the brace portion of the toe plate is able to lay against the base member of the frame so that the toe plate is supported in an extended, operating position suitable for sliding under and lifting loads when the hand truck is used to lift and move loads. The toe plate assembly is also arranged so that the toe plate may be rotated on the toe plate axle between the extended operating position, a minimum depth shipping position and to an upright storage position in which the toe plate lays upon the wheel axle. If the hand truck is arranged with the toe plate in the storage position, the hand truck may be parked next to a wall or the like and thereby require a minimum of floor space and if the hand truck is arranged in the shipping position and the wheels of the hand truck are removed, the hand truck may be shipped in a box with a minimum depth dimension.

DETAILED DESCRIPTION

Figure 1:
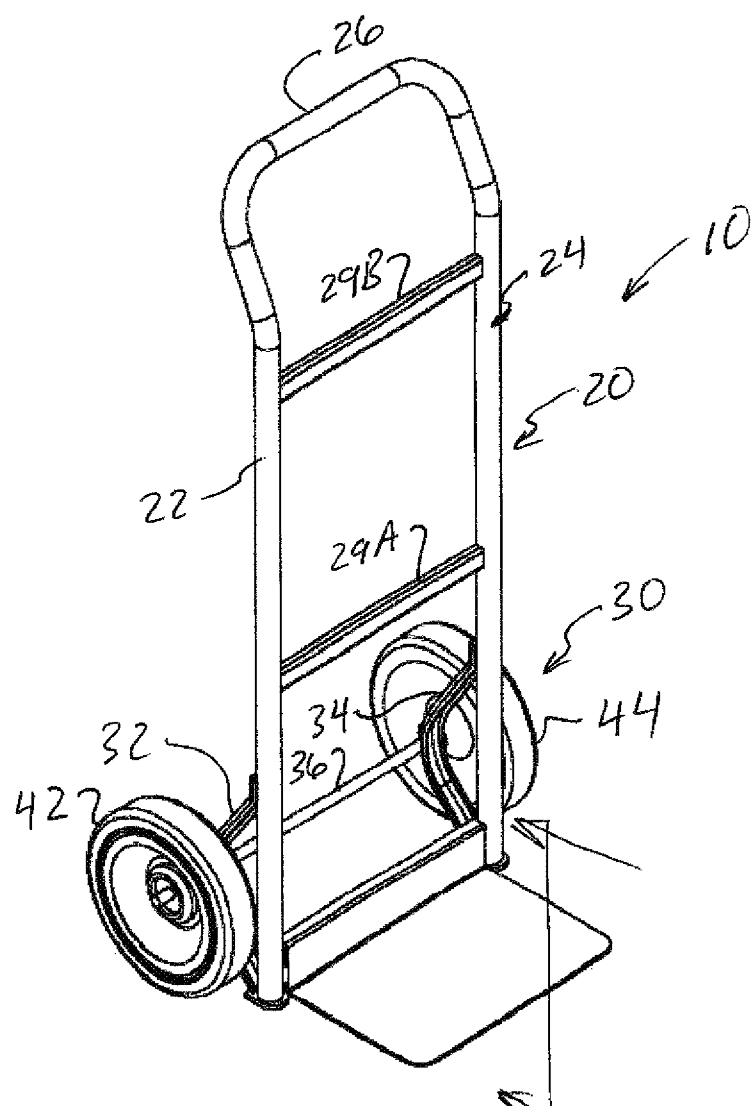
FIG. 1 is a perspective view of one embodiment of the hand truck.
Figure 2:
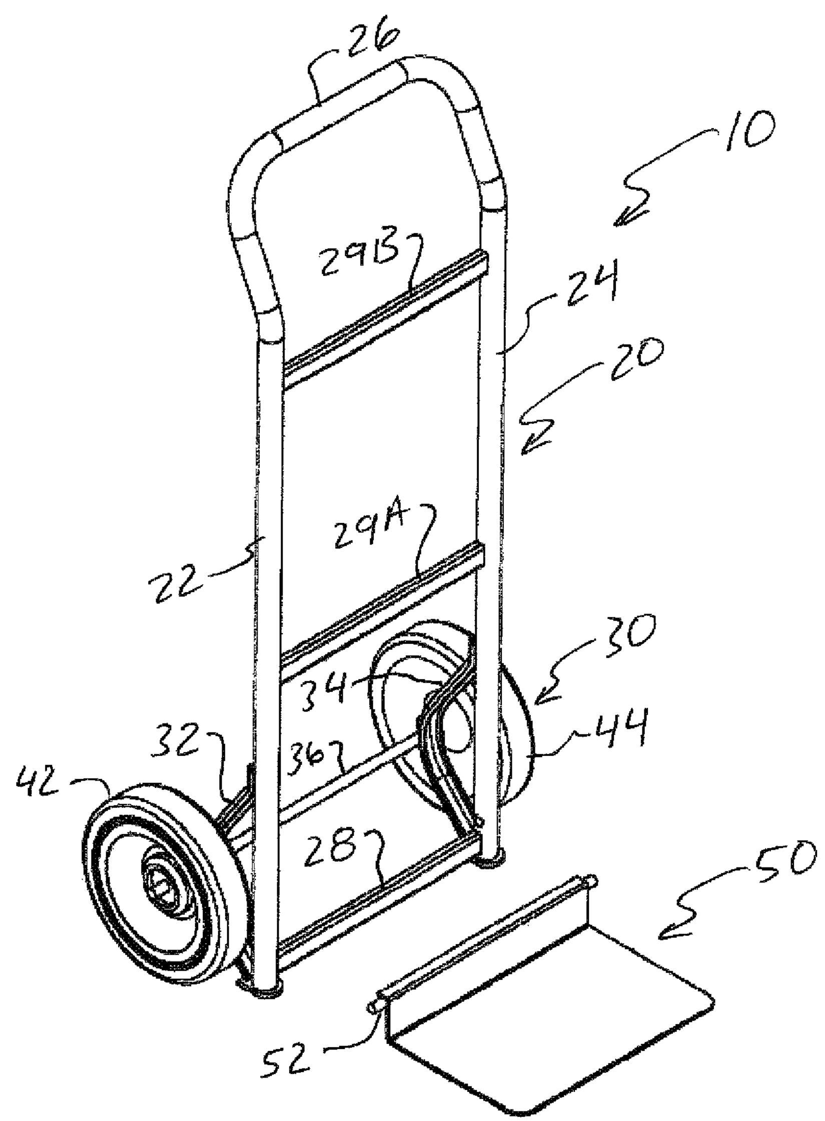
FIG. 2 is an exploded perspective view of one embodiment of the hand truck showing the toe plate assembly removed from the hand truck frame.

Referring to the drawings, FIG. 1 shows one embodiment of a hand truck 10. As can be seen in FIG. 1, hand truck 10 includes a frame assembly 20, a wheel assembly 30 and a toe plate assembly 50.

As can be best understood by referring to FIGS. 1-4, frame assembly 20 includes spaced parallel side members 22 and 24, a handle member 26 and a base member 28. In this example, a pair of cross members 29A and 29B also connect between side members 22 and 24 for added strength. Handle member 26 connects between the upper ends of side members 22 and 24. Base member 28 connects between the lower ends of side members 22 and 24. Wheel assembly 30 is arranged in a way that is well known in the art. A pair of wheel brackets 32 and 34 are fixed to and extend from the rear surfaces of side members 32 and 34 respectively. A wheel axle 36 extends between wheel brackets 32 and 34. Wheels 42 and 44 are mounted at the ends of wheel axle 36 preferably outboard of brackets 32 and 34.

Figure 3:
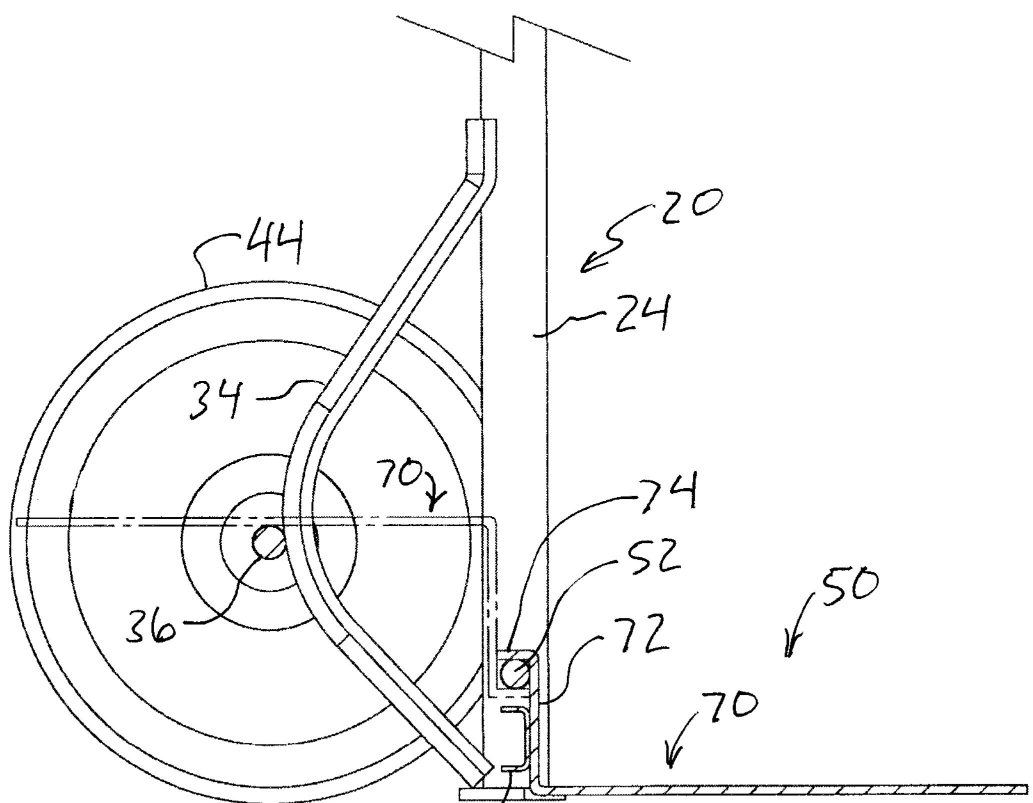
FIG. 3 is a cut-away side view of one embodiment of the hand truck taken from plane A-A of FIG. 1 showing the toe plate in an extended operating position and showing with dashed lines the toe plate in a storage position suitable for placing the hand truck in an upright stored position.
Figure 4:
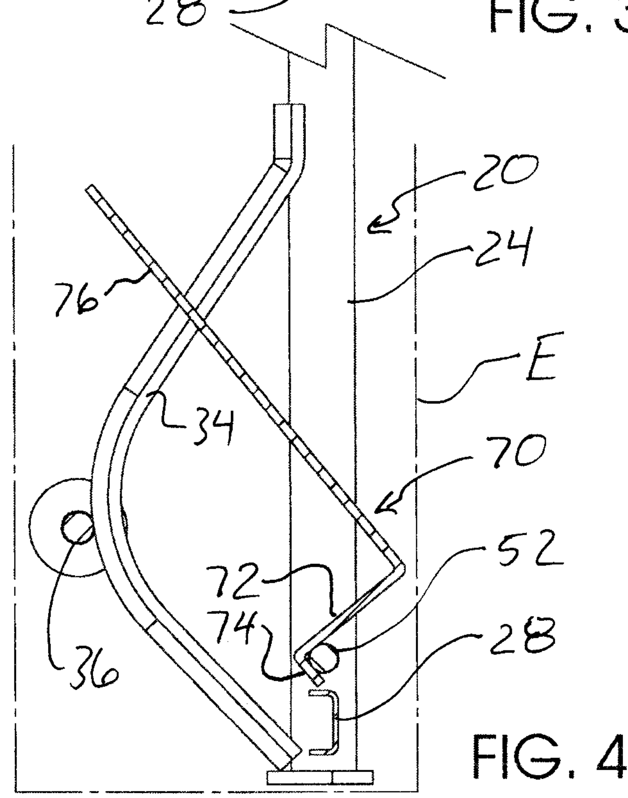
FIG. 4 is a second cut-away side view of one embodiment of the hand truck showing the wheels removed and the toe plate assembly rotated into a minimum depth position suitable for shipping the hand truck in a shipping box.

Toe plate assembly 50 includes a toe plate axle 52 and a toe plate 70. The toe plate axle 52 extends between side members 22 and 24 of frame assembly 20 and is spaced above base member 28. Preferably, toe plate axle 52 is parallel to base member 28 and the spacing between toe plate axle 52 and the bottom of base member 28 is only a fraction of the spacing between side members 22 and 24. As can be seen in FIGS. 3 and 4, the spacing between toe plate axle 52 and the bottom of base member 28 is preferably about one half the longitudinal spacing between the bottom of base member 28 and wheel axle 36. Toe plate 70 is formed so that it is generally L shaped so that it presents a brace portion 72 and a toe portion 76. In this example, brace portion 72 of toe plate 70 presents a return edge portion 74 which is suitable for receiving toe plate axle 52. In this example, toe plate axle 50 is welded to either or both of return edge portion 74 and brace portion 72 so that toe plate 70 is able to rotate on the toe plate axle 52. In this example, toe portion 76 extends away from brace portion 72 at a right angle. In this example, toe plate 70 is fashioned from a formed piece of steel sheet or plate that is able to be formed into a tough, strong member capable of carrying considerable loads.

In actual practice, the assembly of hand truck 10 is preferably accomplished as follows: The U shaped portion of frame 20, cross members 29A, 29B, base member 28, wheel assembly 30 (exclusive of wheels 42 and 44 which can be easily installed later) and toe plate assembly 50 are all held in a welding jig in a position such as is shown in FIG. 1. When all of these parts are in this position, toe plate axle 52 of toe plate assembly 50 is received by two opposite holes (not shown) that are presented by side members 22 and 24 of frame 20 so that toe plate axle 52 is able to rotate. Preferably by automated welding, base member 28 and cross members 29A, 29B as well as base member 28 are welded to side members 22 and 24 of frame 20. Wheel brackets 32 and 34 may also be welded to frame side members 22 and

24 respectively during this step. Also during this step, toe plate axle 52 is welded to toe plate 70 as indicated in FIGS. 3 and 4.

As can be best seen in FIG. 3, toe plate assembly 50 is arranged such that brace portion 72 of toe plate 70 abuts or lays against base member 28 of frame assembly 20 when toe portion 76 is positioned for sliding under and lifting loads during normal operations. The position of toe plate assembly 50 shown in FIG. 3 may be understood as the extended or operating position. By referring to the dashed representation of toe plate 70 as shown in FIG. 3, the skilled reader may see how toe plate assembly 50 is able to be rotated to the storage position so that toe portion 76 is able to lay in a generally horizontal fashion on wheel axle 36. Although this is not illustrated in FIG. 3, it is also preferable that when toe plate assembly 50 is in the storage position indicated by the dashed representation of toe plate 72 in FIG. 3, that toe portion 76 does not extend farther from frame assembly 20 than wheels 42 and 44. Still further, as shown in FIG. 4, when toe portion 76 is between the operating position shown in FIG. 3 and the storage position shown with dashed lines in FIG. 3, and when wheels 42 and 44 are removed, hand truck 10 may be packaged in a box of minimum size as indicated by envelope E shown in FIG. 4. This results in considerable savings in shipping costs. The ability of toe plate assembly 50 to rotate between the three positions described above makes it possible to stow hand truck 10 with a minimum of floor space and also to ship hand truck 10 with a minimum of shipping volume.

It is to be understood that while certain forms of this invention have been illustrated and described, it is not limited thereto, except in so far as such limitations are included in the following claims and allowable equivalents thereof. a Having thus described the invention, what is claimed as new and desired to be secured by Letters Patent is:

What is claimed is:

1. A hand truck comprising:

(a) a frame assembly that includes two side members and a base member extending between the lower ends of the side members, (b) wheels mounted to a wheel axle that is, in turn, mounted to the two side members of the frame assembly by wheel brackets, (c) a toe plate that is rotatably mounted frame assembly, the toe plate presenting a brace portion and a toe portion, the toe portion extending away from the brace portion generally at a right angle, the brace portion of the toe plate being able to lay against the base member of the frame so that the toe plate is supported in an extended, operating position, the toe plate also being able to rotate to a storage position in which the toe plate is oriented toward the rear, the toe plate assembly further able to be rotated into an intermediate shipping position between the operating position and the storage position, whereby, if the wheels are removed, the hand truck may be shipped in a box having a depth that corresponds to the depth dimension of the frame assembly including the wheel brackets.

2. The hand truck of claim 1, wherein, the toe portion of the toe plate is able to lay upon the wheel axle when it is rotated to the storage position.

3. The hand truck of claim 1, further comprising:

a toe plate axle that extends between the side members that rotatably connects with the brace of the toe plate for rotatably mounting the toe plate to the frame assembly.

4. The hand truck of claim 2, further comprising, a toe plate axle that extends between the side members that rotatably connects with the brace of the toe plate for rotatably mounting the toe plate to the frame assembly.

* * * * *